Figure 1:
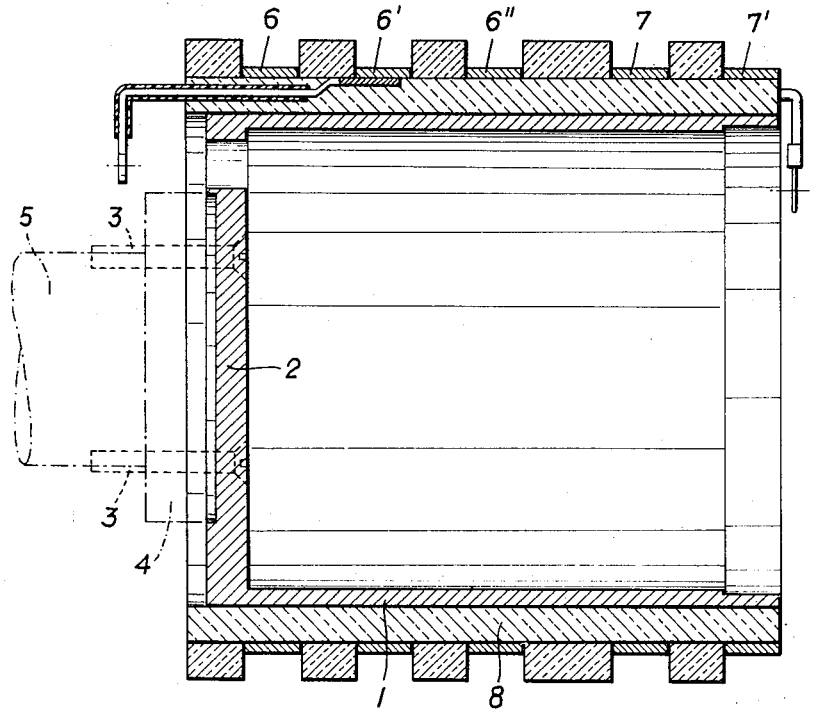

United States Patent [19]
Sogner

[15] 3,701,281
[45] Oct. 31, 1972

[54] MEASURING INSTALLATION
[72] Inventor: Dominik Sogner, Timelkam, Austria
[73] Assignee: Chemiefaser Lenzing Aktiengesellschaft, Lenzing, Austria
[22] Filed: Oct. 6, 1970
[21] Appl. No.: 78,360

[30] Foreign Application Priority Data
   Oct. 7, 1969   Austria ..................... 9423/69

[52] U.S. Cl. ............................ 73/351, 73/362 AR
[51] Int. Cl. ......................... G01k 13/08, G01k 7/20
[58] Field of Search ........ 73/351, 362 AR, 154, 342;
                              340/233; 324/65 R

[56]              References Cited
              UNITED STATES PATENTS
2,414,862   1/1947   Fearon ....................... 73/154
2,007,324   7/1935   Budgett ...................... 73/342

Primary Examiner—Louis R. Prince
Assistant Examiner—Denis E. Corr
Attorney—Brumbaugh, Graves, Donohue & Raymond

[57]              ABSTRACT

A circuit arrangement for measuring a characteristic of a moving member wherein an electric current, representative of the characteristic is generated on the moving member and the value thereof indicated on an instrument mounted on associated fixed structure. The circuit includes a sensing element forming an arm of a bridge network, the output of which provides an input to an operational amplifier. The sensing element, bridge and amplifier, along with a suitable power supply, are mounted on the moving member. The indicating instrument receives the output of the operational amplifier through slip rings or the like and the circuit compensates for the resistance variations normally encountered in slip ring coupling. In a particular application, the circuit arrangement is adapted to measure the temperature of heated rolls in a rolling mill, the sensing element (in this case a resistance thermometer), power supply, bridge and operational amplifier being mounted to rotate with the roll shaft and coupled via slip rings to the indicating instrument.

4 Claims, 3 Drawing Figures

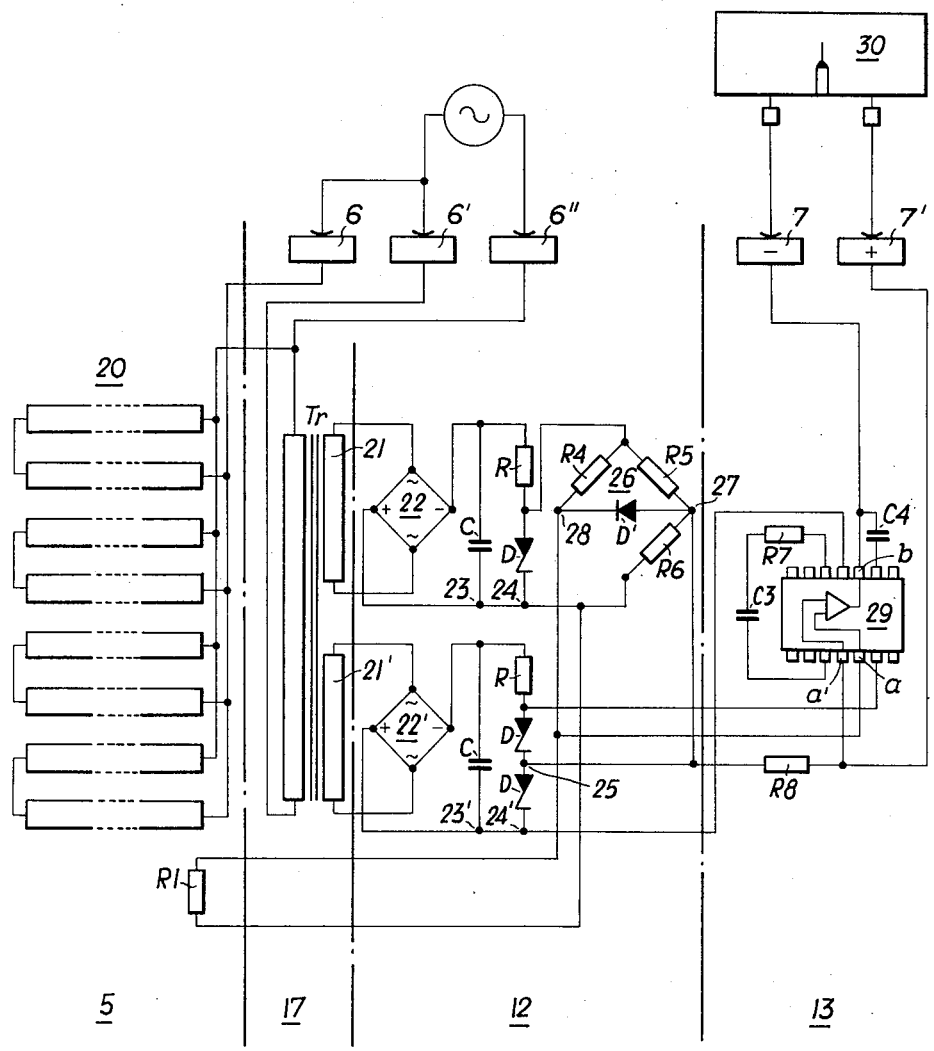

MEASURING INSTALLATION

The invention relates to a measuring installation for collecting and measuring electrical currents between a moving part, such as a slip ring or a slip rail, and a fixed part, such as a current collecting brush or trolley wheel. As used in this description and the appended claims, the terms "slipring" and "current collecting brush" are understood to comprise equivalently sliprails and trolley wheels.

Such measuring installations are used in particular for measuring the temperature of rotating heating rolls containing an electrical resistance heating and a resistance thermometer. Furthermore they are used for measuring the torque in cold and hot rolling mills. Such measuring installations are also used between parts which effect a translatory relative movement, the moving part being designed as slip rail and the fixed part being designed as brush or wheel. Finally such measuring installations may also be applied for transferring a measured value between a fixed rail and a turning wheel.

The difficulty in measuring installations of the known kind resides in transition resistances occuring between the moving part and the fixed part; these transition resistances vary greatly, because they depend on continuously changing external conditions such as dust and dirt accumulation, corrosion and wear. So far it has not been possible to keep the transition resistances constant, or to compensate them within the large scope in which they occur; this, however, is a prerequisite for obtaining reliable values.

The invention is aimed at avoiding the described disadvantages and difficulties and in a measuring installation with two measuring sliprings or measuring rails, and two current collecting brushes or trolley wheels coacting with said rings or rails and electrically connected via a resistance bridge with a measuring device or an individual measuring circuit, resides in that a measuring head containing a current supply part, a resistance bridge, a feed-back resistance and operation amplifier is rigidly connected with the moving part, the output line of the operation amplifier leading via the measuring sliprings or measuring rails and current collecting brushes to the measuring device or measuring circuit.

Preferably the operation amplifier is an integrated differential amplifier with a preferably more then 40,000-fold open amplification.

The measuring circuit preferably consists of an input circuit from the reference point via the resistance bridge to the non-inverting input of the operation amplifier and back to the reference point, and an output circuit from the output of the operation amplifier via a first measuring slipring to the measuring device or the individual measuring circuit, and back from there via a second measuring slipring and the feed-back resistance to the reference point, a feedback wire branching off between the second measuring slipring and the feedback resistance and leading to the inverting input of the operation amplifier. By this wiring plot the transition resistances between the moving and the fixed parts are compensated.

Suitably the measuring head comprises two telescoping parts, the measuring sliprings being arranged on the outer, sleeve-shaped part and the inner part containing the current supply part, filters, stabilizing chains, the resistance bridge, the feed-back resistance and the operation amplifier. Thus, the measuring head, which is moved together with the moving part, obtains a rather compact structure.

According to a preferred embodiment, rectifiers of the current supply part, the filters and the stabilizing chains are arranged on a disc-like plate in the form of a printed circuit, and the resistance bridge, the feed-back resistance and the operation amplifier are arranged on a second disc-like plate also in the form of a printed circuit, so that the current supply part is separated from the measuring part, which fact holds great advantages for manufacturing.

Figure 2:
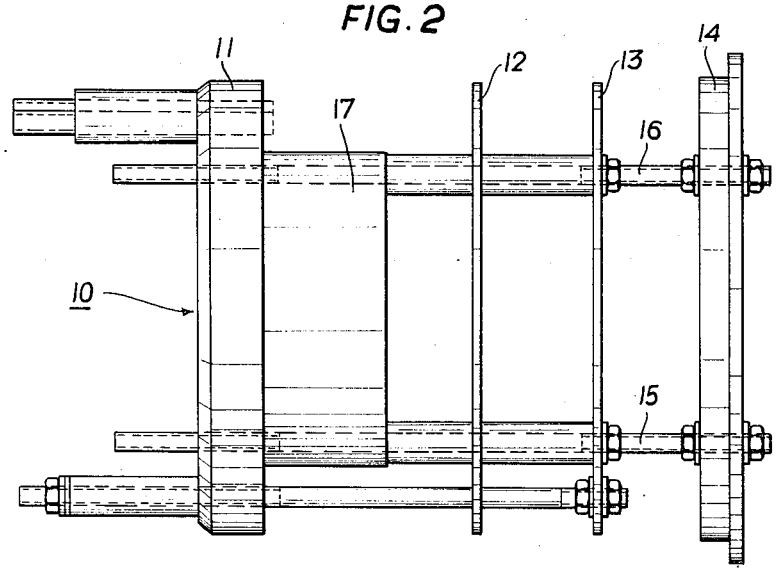

In order that the invention may be more fully understood, it shall now be described with reference to the accompanying drawings, in which FIG. 1 is a vertical sectional view of the sleeve-shaped outer part of the measuring head, FIG. 2 is an elevation showing the inner part of the measuring head and FIG. 3 illustrates the electrical wiring.

In FIG. 1 numeral 1 denotes the sleeve-shaped outer part of the measuring head. The front plate 2 of the measuring head is connectable with a flange 4 of the roll shaft 5 by means of screws 3. On the cylindrical sleeve part a number of sliprings are provided; of these the sliprings 6, 6', 6'' serve for supplying high voltage current for the heat resistances of the rolls, while the sliprings 7, 7' represent the measuring sliprings. Numeral 8 denotes an insulating layer carrying the sliprings 6, 6', 6'', 7, 7' which layer is preferably made of polyester reinforced by fiberglass.

The inner part of the measuring head which fits into the sleeve-like outer part 1 is illustrated in FIG. 2 and generally denoted with numeral 10. It comprises suitably a number of disc-shaped parts, viz, the front guiding disc 11, the conducting plates 12 and 13 and the rear guiding disc 14, which parts are kept together by means of bolts 15, 16. The transformer 17 is fixed to the front guiding disc 11. The conducting plate 12 contains in the form of a printed circuit rectifiers, filters and stabilizing chains; the guiding plate 13 contains, likewise in the form of a printed circuit, the resistance bridge, the feed-back resistance and the operation amplifier, as will be described in greater detail in connection with the electrical part of the installation.

FIG. 3 shows details of the electrical wiring. The high voltage current sliprings are denoted with numerals 6, 6', 6'', the slip ring 6'' being the zero-conductor on the one hand for the transformer 17 and on the other hand for the heat rods 20 mounted within the roll. 6, 6' are the other sliprings for supplying the heat rods 20 on the one hand and the transformer 17 on the other hand. Behind the transformer 17 two galvanically separated chains are arranged, comprising the secondary windings 21, 21', rectifiers 22, 22', filters 23, 23' with condensers C and stabilizing chains 24, 24', each being provided with a resistance R and breakdown (Zener) diodes D, the chain 24' being stabilized by two diodes D connected in series. The reference point of the measuring circuit is denoted with 25. The measuring or resistance bridge 26, which is formed by the resistances R1 of the resistance thermometer (sensing probe), R4, R5, and R6 is supplied from the chain 24. D' in the measuring bridge 26 represents a diode for protection against overloading of the operation amplifier in case the current is interrupted at the temperature probe R1. 27 is the positive output of the measuring bridge 26, 28 is the negative output. The measuring circuit is formed by an input circuit and an output circuit. The input circuit leads from the reference point 25 via the resistance bridge 26 to the non-inverting input *a* of the operation amplifier 29 and from the operation amplifier back to the reference point 25. The output circuit leads from the output *b* of the operation amplifier 29 via the measuring slipring 7 and the corresponding current collecting brush to the measuring device 30 and from there back via a current collecting brush and the measuring slipring 7' to the inverting input *a'* of the operation amplifier 29. As may be derived from the drawing, the feed-back resistance R8 lies between the input *a'* and the reference point 25. The inverting input *a'* of the operation amplifier 29 acts in this circuit as connection point between input and output circuit. By this connection an imprint of the output current is achieved. The condensors C3 and C4 and the resistance R7 in the operation amplifier 29 serve for stabilizing the frequency and have no influence on the measurement.

The circuit functions in the following manner: If between the output *b* of the operation amplifier 29 and the measuring device 30, i.e., in the apparent ohmic resistance circuit, a resistance variation occurs, a proportional voltage change takes place at the feedback resistance R8, so that the amplification of the operation amplifier 29 is influenced in a manner that the resistance change is compensated in the output circuit of the measuring circuit. Since the operation amplifier 29 is an integrated differential amplifier with high, open amplification, e.g., 40,000-fold or more, there is always sufficient reserve current present to overcome resistance variations up to 10 kohm in the apparent ohmic resistance circuit. Thus, resistance fluctuations in the apparent ohmic resistance circuit cannot influence the accuracy of the measurement.

If instead of a measuring or indicating device a measuring circuit is used, e.g., a bridge circuit, the incoming value at the measuring circuit may be used for purposes of regulation or control.

What I claim is:

1. An arrangement for producing electrical currents on a moving part and conveying them to a non-moving indicating instrument, such as for use in the measurement of the temperature of electrically heated rotating heating rolls having a temperature sensitive resistance associated therewith, said arrangement comprising a pair of slip rings on said moving part, a pair of stationary current collecting brushes coacting with said slip rings, said indicating instrument being coupled between said brushes, a measuring head rigidly mounted on said moving part having a resistance bridge producing an output related to a characteristic of the moving part and circuit means including an operation amplifier for delivering a current representative of the output of said bridge to said indicating instrument through said slip rings and brushes, said circuit means compensating for resistance fluctuations occurring in said slip ring brush couplings, said measuring head further comprising current supply means, means coupling said resistance bridge to a reference point in said supply means, said operation amplifier including inverting and non-inverting inputs and an output, means coupling the output of said resistance bridge to the non-inverting input of the operation amplifier and to said reference point, means coupling the output of said operation amplifier to one of said slip rings, means coupling the other of said slip rings to the inverting input of the operation amplifier, and a feedback resistance connected between said inverting input and said reference point.

2. A measuring arrangement according to claim 1, wherein the measuring head comprises two telescoping parts, the slip rings being arranged on an outer, sleeve-shaped part, the inner part including a pair of disk-like printed circuit plates, one of said plates constituting said current supply means and the other of said plates constituting said resistance bridge, operation amplifier and feedback resistance.

3. An arrangement for producing electrical currents on a moving part and conveying them to a non-moving indicating instrument, such as for use in the measurement of the temperature of electrically heated rotating heating rolls having a temperature sensitive resistance associated therewith, said arrangement comprising, a pair of slip rings on said moving part, a pair of stationary current collecting brushes coacting with said slip rings, said indicating instrument being coupled between said brushes, a measuring head rigidly mounted on said moving part having a resistance bridge producing an output related to a characteristic of the moving part and circuit means including an operation amplifier for delivering a current representative of the output of said bridge to said indicating instrument through said slip rings and brushes, said circuit means compensating for resistance fluctuations occurring in said slip ring brush couplings, said measuring head comprising two telescoping parts, the slip rings being arranged on an outer, sleeve-shaped part, the inner part carrying the remaining components of said measuring head.

4. An arrangement for producing electrical currents on a moving part and conveying them to a nonmoving indicating instrument, such as for use in the measurement of the temperature of electrically heated rotating heating rolls having a temperature sensitive resistance associated therewith, said arrangement comprising, a pair of slip rings on said moving part, a pair of stationary current collecting brushes coacting with said slip rings, said indicating instrument being coupled between said brushes, a measuring head rigidly mounted on said moving part having a resistance bridge producing an output related to a characteristic of the moving part and circuit means including an operation amplifier for delivering a current representative of the output of said bridge to said indicating instrument through said slip rings and brushes, said circuit means including feedback resistance means to couple the output of said operation amplifier to its input whereby said circuit means compensates for resistance fluctuations occurring in said slip ring-brush couplings.

* * * * *